(12) United States Patent
Garcia-Martinez et al.

(10) Patent No.: US 10,607,302 B1
(45) Date of Patent: *Mar. 31, 2020

(54) GUIDING PROGRESSIVE USER ENGAGEMENT IN AN ONLINE ENVIRONMENT

(71) Applicant: Facebook, Inc., Menlo Park, CA (US)

(72) Inventors: Antonio Felipe Garcia-Martinez, Alameda, CA (US); Nipun Mathur, Belmont, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,798

(22) Filed: Jan. 7, 2019

Related U.S. Application Data (63) Continuation of application No. 13/553,476, filed on Jul. 19, 2012, now Pat. No. 10,217,172.

(51) Int. Cl.
*G06F 3/048* (2013.01)
*G06Q 50/00* (2012.01)
*G06F 3/0481* (2013.01)

(52) U.S. Cl.
CPC .......... *G06Q 50/01* (2013.01); *G06F 3/0481* (2013.01)

(58) Field of Classification Search
CPC combination set(s) only.
See application file for complete search history.

(56) References Cited

U.S. PATENT DOCUMENTS

| 8,171,128 B2* | 5/2012 | Zuckerberg | G06Q 30/02 709/224 |
| 8,892,650 B2 | 11/2014 | Li et al. | |
| 2006/0136453 A1 | 6/2006 | Kwan | |
| 2007/0112792 A1 | 5/2007 | Majumder | |
| 2008/0040474 A1* | 2/2008 | Zuckerberg | G06Q 30/02 709/224 |
| 2009/0119167 A1* | 5/2009 | Kendall | G06Q 30/02 705/14.17 |
| 2009/0222348 A1 | 9/2009 | Ransom et al. | |
| 2011/0106834 A1 | 5/2011 | Blackwell et al. | |
| 2011/0208822 A1 | 8/2011 | Rathod | |
| 2011/0288939 A1 | 11/2011 | Elvekrog et al. | |
| 2012/0137174 A1 | 5/2012 | Berkovitz et al. | |
| 2012/0151359 A1* | 6/2012 | Mysen | G06F 11/3438 715/736 |
| 2013/0073388 A1 | 3/2013 | Heath | |
| 2013/0132863 A1 | 5/2013 | Lansford et al. | |
| 2014/0006501 A1* | 1/2014 | Li | G06Q 30/0269 709/204 |
| 2014/0172550 A1 | 6/2014 | Reddy et al. | |

* cited by examiner

Primary Examiner — Ryan Barrett
Assistant Examiner — Haimei Jiang
(74) Attorney, Agent, or Firm — Fenwick & West LLP (57) ABSTRACT

An entity having a brand page maintained by a social networking system defines a sequence of content items associated with a brand page is determined. Different content items in the sequence include different information that is dependent on interaction between a user and the sequence. For example, content items in the sequence provide increasingly more detailed or complex information when progressing from the first content item to the last content item in the sequence. When a viewing user of a social networking system interacts with the brand page, prior interactions with the sequence by the viewing user are used to classify the viewing user and to select a content item from the sequence that is communicated to the viewing user.

20 Claims, 3 Drawing Sheets

GUIDING PROGRESSIVE USER ENGAGEMENT IN AN ONLINE ENVIRONMENT

CROSS REFERENCE TO RELATED APPLICATIONS

This application is a continuation of co-pending U.S. application Ser. No. 13/553,476, filed Jul. 19, 2012, which is incorporated by reference in its entirety.

BACKGROUND

Embodiments of the present disclosure relate generally to social networking and, more specifically, to distribution of content items to users of a social networking system.

Social networks, or social utilities that track and enable connections between members (including people, businesses and other entities), have become prevalent in recent years. In particular, a social networking system allows users to more efficiently communicate information that is relevant to their friends or other connections in the social network. Social networks typically incorporate a system for maintaining connections among users of the social network and links to content that is likely to be relevant to the users. Social networks also collect and maintain information about their users. This information may be static, such as geographic location, employer, job type, age, music preferences, interests, and a variety of other attributes, or it may be dynamic, such as tracking a user's actions within the social network. This information about the users may then be used to target content delivery so that users are more likely to receive content of interest to them.

While social networking systems allow individuals who are social network users to exchange information with each other, they also allow entities to provide information to social networking system users. Examples of entities include businesses, organizations and celebrities. An entity may create a brand page, which is associated with a profile, within the social networking system and post content items to the brand page. The social networking system then communicates the posted content item or a description of the posted content item to social networking system users connected to the brand page. Hence, the brand page allows the entity to act as any other user of the social networking system and disseminate information to other social networking system users.

However, various types of entities have a segmented audience, so different social networking system users may have differing levels of interest in various content items posted to the brand page. For example, users connected to a brand page associated with a sporting goods supplier may have varying degrees of interest in posts on the brand page based on the relevance of posts to different sports. Conventionally, users connected to a brand page are notified of content posted to the brand page without accounting for various users having differing levels of interest in different content posted to the brand page.

SUMMARY

To improve interaction with an entity via a social networking system, the entity may define a sequence of content items associated with a brand page in the social networking system associated with the entity. Different content items in the sequence may include different information that depends on interaction between a social networking system user and the sequence. For example, content items in the sequence provide increasingly more detailed or complex information when progressing from the first content item to each successive content item in the sequence. As another example, content items in the sequence may provide supplemental or background information, allowing a user who is newly accessing the brand page to better understand content shown by the brand page. When a viewing user of a social networking system interacts with the brand page, prior interactions by the viewing user with the sequence are determined from a user profile associated with the viewing user. The viewing user may be classified based on the user's prior interactions with the brand page, and the classification is used to select a content item from the sequence that is communicated to an electronic device associated with the viewing user.

Additionally, a sequence of content items may be used to introduce a user to content on a brand page. If a user has not previously interacted with a brand page, content posted on the brand page may be difficult for the user to understand or may be too specific for a user with limited knowledge about the brand page. When a user initially accesses a brand page, the user may be directed through a sequence of content items providing background or informational content about content on the brand page. For example, the sequence may describe different products described by content on the brand page or explain terminology used by content on the brand page. In one embodiment, a user is directed through a sequence of content items when first accessing a brand page, and receives content from the brand page after accessing the final content item in the sequence. The content items in the sequence presented to the user may be selected based on the user's interaction with previously-presented content items in the sequence, which allows the user to be classified based on the interactions with content items in the sequence. Hence, users accessing the brand page for the first time are directed through a sequence of content items to provide information about the brand page and conventionally view the brand page content when accessing the brand page after completing the sequence.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system allows its users to communicate and interact with each other. Users join the social networking system and add connections to other users to whom they desire to be connected. This allows individuals joining the social networking system to form connections with and exchange information with other individuals. Entities providing goods and/or services may also join the social networking system and form connections to other users. For example, a manufacturer of goods, a service provider, a retailer or another business may join the social networking system, allowing other users to become connected to the manufacturer, service provider, retailer, business or other entity.

An entity may generate and maintain a brand page on the social networking system, where the entity posts information about itself, about its products or provides other information to users of the social networking system. The users may connect to the brand page to receive updates about information posted to the brand page or to receive information from the brand page. This allows an entity to provide information about itself or its products and/or services to social networking system users to form a stronger relationship between users and the entity or to increase interest in the entity by social networking system users.

However, users connected to a brand page may have varying degrees of knowledge about the entity corresponding to the brand page or about products or services offered by the entity. Similarly, users connected to a brand page may have differing levels of interest in different products or services offered by the brand page. For example, users connected to a brand page for a sporting equipment supplier may be interested in information on the brand page about tennis equipment offered by entity while being uninterested in information on the brand page about golf equipment. As another example, a user interacting with the brand page for the first time may have limited knowledge about products offered by the entity associated with the brand page, so content on the brand page describing specific product detail may have little value to the user.

To strengthen a relationship between social networking system users and a brand page, the entity associated with the brand page may define a sequence of content items, with different content items in the sequence providing different information. The content item from the sequence that is presented to a user is selected based on previous interaction, or interactions, between the user and the sequence. This allows the entity to provide a user with content that is customized based on the user's previous experience with or exposure to the sequence, increasing the likelihood that the presented content engages the user.

Additionally, content items from a sequence may be presented to a user accessing a brand page for the first time. For example, a user may be presented with a sequence of content items describing content already on the brand page, describing the entity associated with the brand page, describing terminology used by the brand page or other information when accessing a brand page for the first time. The sequence allows the user to more quickly understand content on a brand page to increase the likelihood of further interaction between the user and the brand page.

Figure 1A:
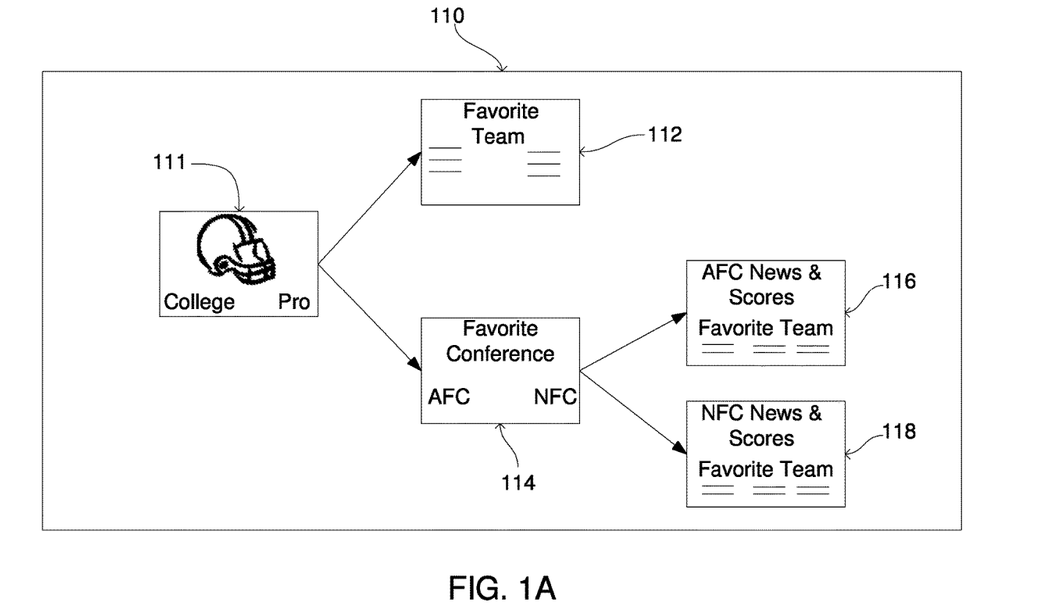
FIGS. 1A and 1B show example sequences of content items for presentation to a social networking system user, in accordance with an embodiment of the invention.
Figure 1B:
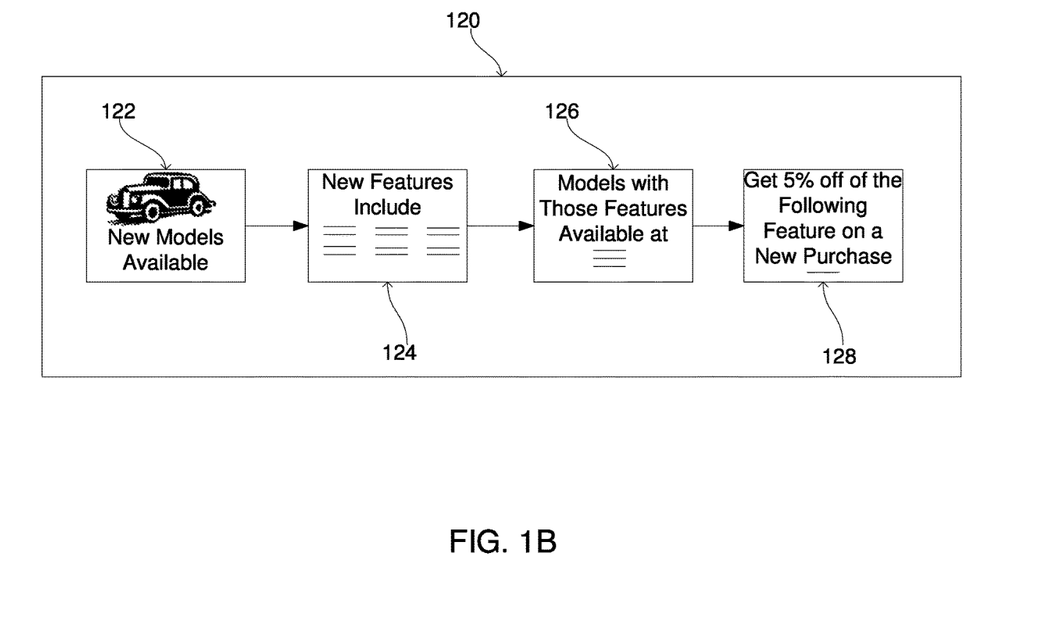

FIGS. 1A and 1B show examples of sequences 110, 120 of content items for presentation to social networking system users. Different content items in a sequence 110, 120 include different information, with the content item presented to a user determined from prior interactions by the user with content items in the sequence 110, 120. In various embodiments, the content items in a sequence 110, 120 may be presented to a user in different ways. For example, content items may be presented as a post on a brand page, as a story in a news feed communicated to a user, as a message transmitted to a user or may be presented in any other suitable manner. An entity may define a sequence 110, 120 in a variety of ways to differently present information to a user. For example, an entity may classify a user based on interactions with content items within a sequence 110, 120 or may use a sequence 110, 120 to provide a user with information about performing a task. As another example, an entity may provide background information about content on a brand page to a user through a sequence 110, 120.

In the first sequence 110 shown by FIG. 1A, an entity associated with a brand page obtains information about a user based on the user's interaction with content items in the first sequence 110. For purposes of illustration, the example first sequence 110 shown in FIG. 1A identifies a user's favorite football team; however, other information about the user may be obtained in a similar fashion. In the first sequence 110, content items are organized so that an increasing level of detail about the user is obtained as the user traverses the first sequence 110. In FIG. 1A, the initial content item 111 in the first sequence 110 prompts the user to select between college football and professional football, and the user's selection determines the content item from the first sequence 110 next presented to the user.

In the first sequence 110, if the user selects college football from the initial content item 111, a final content item 112 prompting the user to select a favorite team is presented. In one embodiment, the final content item 112 is presented when the user next views the brand page after interacting with the initial content item 111. Alternatively, the user is notified of the final content item 112 via a news feed story or a message received after interacting with the initial content item 111. The first sequence 110 is completed after the user selects a favorite team from the final content item 112, and the entity associated with the brand page has received information that the user prefers college football and identifying the user's favorite college football team. This user-specific information allows the entity to provide additional content better tailored to the user's interests.

However, if the user selects professional football from the initial content item 111, the first sequence 110 presents the user with a subsequent content item 114 prompting the user to select a favorite conference. In response to selecting a conference from the subsequent content item 114, the user is presented an additional content item 116, 118 to the user. As shown in FIG. 1, the information included in an additional content item 116, 118 depends on the conference selected from the subsequent content item 114. For example, if the AFC was selected in the subsequent content item 114, a first additional content item 116 prompts the user to select a favorite team in the AFC. If the NFC was selected in the subsequent content item 114, a second additional content item 118 prompts the user to select a favorite team from the NFC. Additionally, the first additional content item 116 may include AFC-specific news and scores and the second additional content item 118 may include NFC-specific news and scores. Thus, the first sequence 110 allows identification of a user's preference for professional football, the user's preferred professional football conference and favorite team.

A sequence 110, 120 may present content items encouraging or guiding a user to perform an action. The second sequence 120 shown in FIG. 1B is an example where content items are organized to entice a user to purchase a new car from an entity. When a user interacts with the entity's brand page for the first time, an initial content item 122 indicating that the entity has new car models available is presented. As described above, the initial content item 122, and other content items in the second sequence 120, may be presented to the user in any suitable manner.

After presenting the initial content item 122 to the user, a subsequent content item 124 from the second sequence 120 is presented to the user. For example, the subsequent content item 124 describes features available in a new car model, allowing the user to identify features of interest. In response to the user selecting one or more features from the subsequent content item 124, an additional content item 126 is presented to the user identifying dealerships having models with the selected one or more features available. The information in the additional content item 126 may incorporate information from a user's profile, such as the user's location, in addition to the interaction between the user and the subsequent content item 124. For example, the additional content item 126 identifies dealerships within a predetermined radius of a location in a user's profile maintained by the social networking system and having models available with the features identified by the user from the subsequent content item 124.

Responsive to the user interacting with the additional content item 126, a final content item 128 from the second sequence 120 is presented to the user. In the example of FIG. 1B, the final content item 128 provides the user with an incentive to purchase a new car from a dealership selected from the additional content item 126. For example, the final content item 128 is a coupon or rebate applicable to a feature identified from the subsequent content item 124 when a new model is purchased from a dealership identified from the additional content item 126. Hence, the second sequence 120 presents content items in a series to entice a user to make a purchase or perform an action.

A sequence of content items allows customized interaction between a user and a brand page. Based on interaction with content items in a sequence, an entity associated with the brand page may determine specific interests of a user within a broader topic (e.g., a specific interest in running within the broader topic of sports) or may determine a user's familiarity with information provided by the brand page. Additionally, an entity may use a sequence to encourage or entice the user to take an action by exposing the user to progressive stages in a marketing or sales campaign. As another example, a sequence provides a user interacting with the brand page for the first time with additional information about content on the brand page, allowing a more meaningful first-time interaction between the brand page and the user. Thus, defining a sequence of content items allows an entity to guide development of the relationship between the entity and a user.

System Architecture

Figure 2:
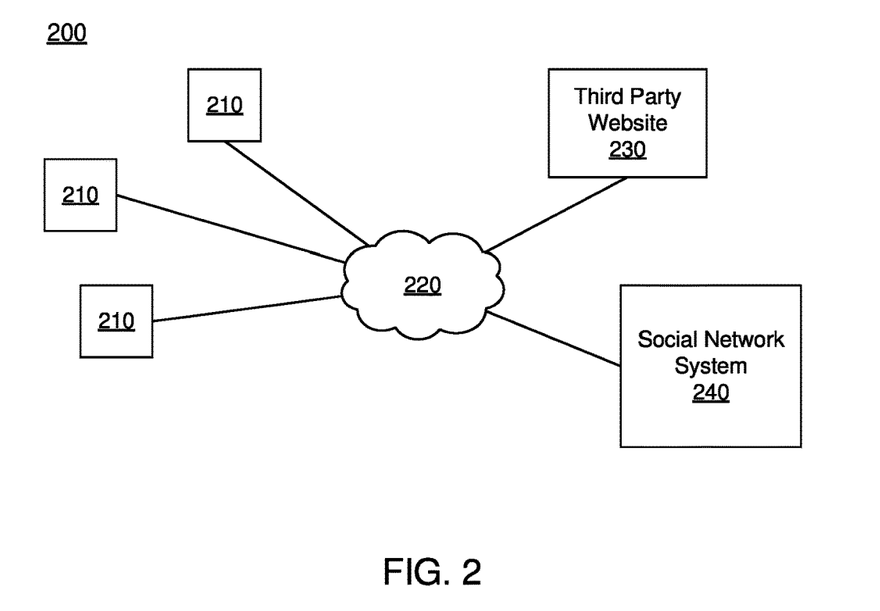
FIG. 2 is a block diagram of a system architecture for providing content items to users of a social networking system, in accordance with an embodiment of the invention.

FIG. 2 is a high level block diagram illustrating a system environment 200 for a social networking system 240. The system environment 200 comprises one or more client devices 210, a network 220, one or more third-party websites 230 and the social networking system 240. In alternative configurations, different and/or additional components may be included in the system environment 200. The embodiments described herein can be adapted to online systems that are not social networking systems.

The client devices 210 comprise one or more computing devices capable of receiving user input as well as transmitting and/or receiving data via the network 220. In one embodiment, a client device 210 is a conventional computer system, such as a desktop or laptop computer. In another embodiment, a client device 210 may be a device having computer functionality, such as a personal digital assistant (PDA), mobile telephone, smart-phone or similar device. A client device 210 is configured to communicate via the network 220. In one embodiment, a client device 210 executes an application allowing a user of the client device 210 to interact with the social networking system 240. For example, a client device 210 executes a browser application to enable interaction between the client device 210 and the social networking system 240 via the network 220. In another embodiment, a client device 210 interacts with the social networking system 240 through an application programming interface (API) that runs on the native operating system of the client device 210, such as iOS® or ANDROID™.

The client devices 210 are configured to communicate via the network 220, which may comprise any combination of local area and/or wide area networks, using both wired and wireless communication systems. In one embodiment, the network 220 uses standard communications technologies and/or protocols. Thus, the network 220 may include links using technologies such as Ethernet, 802.11, worldwide interoperability for microwave access (WiMAX), 3G, 4G, CDMA, digital subscriber line (DSL), etc. Similarly, the networking protocols used on the network 220 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 220 may be represented using technologies and/or formats including hypertext markup language (HTML) or extensible markup language (XML). In addition, all or some of links can be encrypted using conventional encryption technologies such as secure sockets layer (SSL), transport layer security (TLS), and Internet Protocol security (IPsec). The third party website 230 may be coupled to the network 220 for communicating with the social networking system 240, which is further described below in conjunction with FIG. 3.

Figure 3:
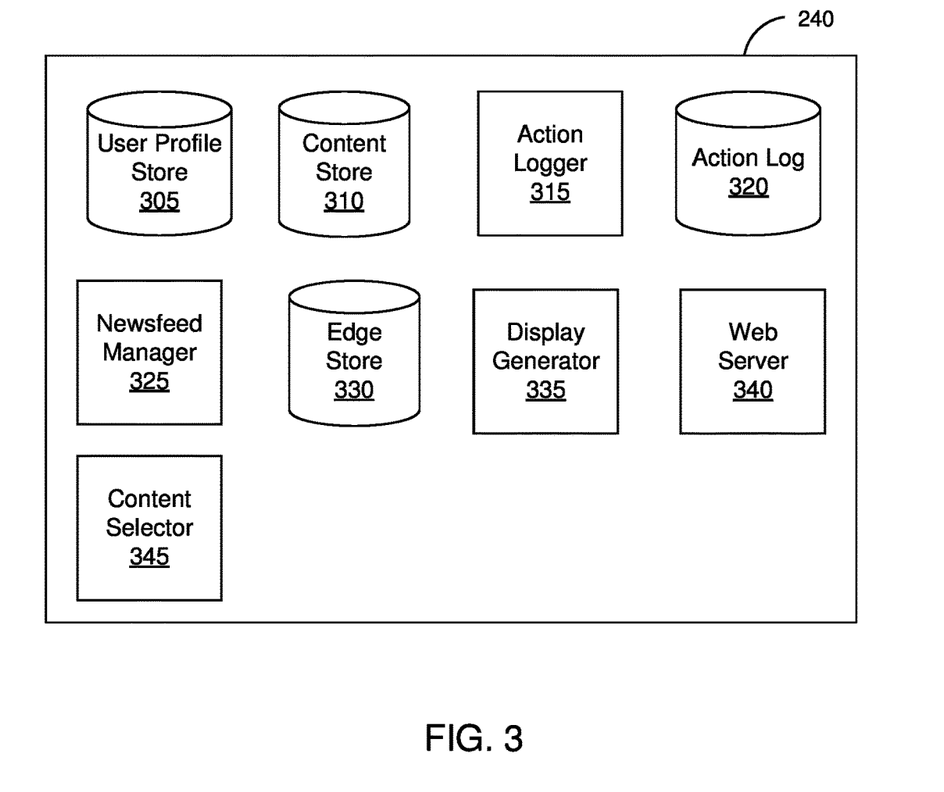
FIG. 3 is a block diagram of a social networking system, in accordance with an embodiment of the invention.

FIG. 3 is an example block diagram of a system architecture of the social networking system 240. The social networking system 240 includes a user profile store 305, a content store 310, an action logger 315, an action log 320, a news feed manager 325, an edge store 330, a display generator 335, a web server 340 and a content selector 345. In other embodiments, the social networking system 240 may include additional, fewer, or different modules for various applications. Conventional components such as network interfaces, security functions, load balancers, failover servers, management and network operations consoles, and the like are not shown so as to not obscure the details of the system architecture.

Each user of the social networking system 240 is associated with a user profile, which is stored in the user profile store 305. A user profile includes declarative information about the user that was explicitly shared by the user, and may also include profile information inferred by the social networking system 240. In one embodiment, a user profile includes multiple data fields, each data field describing one or more attributes of the corresponding user of the social networking system 240. The user profile information stored in user profile store 305 describes the users of the social networking system 240, including biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 240 displayed in an image. A user profile in the user profile store 305 may also maintain references to actions by the corresponding user performed on content items in the content store 310 and stored in the action log 320.

While user profiles in the user profile store 305 are frequently associated with individuals, allowing people to interact with each other via the social networking system 240, user profiles may also be stored for entities such as businesses or organizations. This allows an entity to establish a presence on the social networking system 240 for connecting and exchanging content with other social networking system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 310 stores content items associated with a user profile, such as images, videos or audio files. Content items from the content store 310 may be displayed when a user profile is viewed or when other content associated with the user profile is viewed. For example, displayed content items may show images or video associated with a user profile or show text describing a user's status. Additionally, other content items may facilitate user engagement by encouraging a user to expand his connections to other users, to invite new users to the system or to increase interaction with the social network system by displaying content related to users, objects, activities, or functionalities of the social networking system 240. Examples of social networking content items include suggested connections or suggestions to perform other actions, media provided to, or maintained by, the social networking system 240 (e.g., pictures or videos), status messages or links posted by users to the social networking system, events, groups, pages (e.g., representing an organization or commercial entity), and any other content provided by, or accessible via, the social networking system.

The content store 310 may also include one or more brand pages associated with user profiles of entities. A brand page comprises content associated with the entity and instructions for presenting the content to a social networking system user. For example, a brand page identifies content associated with the entity's user profile as well as information describing the content is formatted when presented to users via the brand page. The content store 310 may also include one or more sequences of content items associated with a brand page. As described above in conjunction with FIG. 1, a sequence includes multiple content items, with different content items in the sequence including different information that is dependent on interaction between a user and the sequence. For example, content items in a sequence provide more detailed or complex information as a user interacts with more content items in the sequence, allowing the information presented to the user to be modified based on user interaction with content from the sequence.

The action logger 315 receives communications about user actions on and/or off the social networking system 240. The action logger 315 populates the action log 320 with information about user actions, allowing the actions to be tracked. Example actions include: adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. These actions are stored in the action log 320. The action logger 315 also receives data describing interaction between a user and a sequence and communicates the interaction between user and sequence to the action log 320. For example, the action logger 315 receives an indication of the content item in a sequence with which the user interacts and a description of the interaction with the content item, such as a type of interaction.

The action log 320 may be used by the social networking system 240 to track users' actions on the social networking system 240 as well as external websites that communicate information back to the social networking system 240, such as the third party website 230. Users may interact with various objects on the social networking system 240, including commenting on posts, sharing links, and checking-in to physical locations via a mobile device, accessing content items in a sequence or other interactions. Information describing these actions is stored in the action log 320. Additional examples of interactions with objects on the social networking system 240 included in the action log 320 include commenting on a photo album, communications between users, becoming a fan of a musician, adding an event to a calendar, joining a groups, becoming a fan of a brand page, creating an event, authorizing an application, using an application and engaging in a transaction. Additionally, the action log 320 records a user's interactions with advertisements on the social networking system 240, interactions with sequences of content items, as well as interactions with applications operating on the social networking system 240.

The action log 320 may also include user actions on external websites. For example, an e-commerce website that primarily sells sporting equipment at bargain prices may recognize a user of a social networking system 240 through social plug-ins that enable the e-commerce website to identify the user. Because users of the social networking system 240 are uniquely identifiable, e-commerce websites, such as this sporting equipment retailer, may use the information about these users as they visit their websites. The action log 320 records data about these users, including viewing histories, advertisements that were clicked on, purchasing activity, and buying patterns.

A news feed manager 325 selectively provides content to users of a social networking system 240 and records the consumption of content by users. In one embodiment, the news feed manager 325 generates stories for a user describing actions taken by other members of the social networking system 240 to whom the user is connected. For example, the news feed generated for a user describes comments made by other users to whom the user is connected, content posted to the social network system 240 by other users to whom the user is connected or other actions taken by other users to whom the user is connected. New news feed stories generated for a user by the news feed manager 325 may be ranked and stored by the social networking system 240. The news feed manager 325 may communicate with client devices 210 through the network 220 to provide content to users of the social networking system 240.

In one embodiment, the news feed manager 240 may provide content through a social plug-in, such as an iFrame, to a third party website 230 to provide content posted on the social networking system 240 about an entity associated with the third party website 230. As an example, a business entity creating a brand page on the social networking system 240 may desire to publish content items posted on the brand page's news feed in the social networking system 240 to a third party website 230 via a social plug-in installed on the third party website 230.

In one embodiment, an edge store 330 stores information describing connections between users and other objects on the social networking system 240 in edge objects. Some edges may be defined by users, allowing users to specify their relationships with other users. For example, users may generate edges with other users that parallel the users' real-life relationships, such as friends, co-workers, partners, and so forth. Other edges are generated when users interact with objects in the social networking system 240, such as expressing interest in a page on the social networking system, sharing a link with other users of the social networking system, and commenting on posts made by other users of the social networking system. The edge store 330 stores edge objects that include information about the edge, such as affinity scores for objects, interests, and other users. Affinity scores may be computed by the social networking system 240 over time to approximate a user's affinity for an object, interest, and other users in the social networking system 240 based on the actions performed by the user. Multiple interactions between a user and a specific object may be stored in one edge object in the edge store 330, in one embodiment. In some embodiments, connections between users may be stored in the user profile store 310, or the user profile store 310 may access the edge store 330 to determine connections between users.

The web server 340 links the social networking system 240 via the network 220 to the one or more client devices 210, as well as to the one or more third party websites 230. The web server 340 serves web pages, as well as other web-related content, such as JAVA®, FLASH®, XML and so forth. The web server 340 may provide the functionality of receiving and routing messages between the social networking system 240 and a client device 210, for example, instant messages, queued messages (e.g., email), text and SMS (short message service) messages, or messages sent using any other suitable messaging technique. A user may send a request to the web server 340 to upload information, for example, images or videos that are stored in the content store 310. Additionally, the web server 340 may provide API functionality to send data directly to native user device operating systems, such as iOS®, ANDROID™, webOS® or a similar embedded operating system.

The content selector 345 identifies a content item from the content store 310 for presentation to the user via a brand page, a news feed story, a message or any other suitable distribution channel. In one embodiment, the content selector 345 selects a content item from a sequence for presentation to a user. The content selector 345 communicates with the user profile store 305 and the action log 320 to identify prior user interactions with a sequence and selects an item from the sequence based on the prior user interactions. For example, the content selector 345 determines whether a user has interacted with content items in a sequence and/or what type of interactions with content items in the sequence the user has made from the action log 320 and selects a content item from the sequence accordingly.

In one embodiment, the content selector 345 also classifies the user based on the user's interactions with the sequence retrieved from the action log 320 and use the resulting classification to select an item from the sequence. The user classification may also account for information in the user's profile and/or criteria specified by an entity associated with the brand page. The classification by the content selector 345 may also be used to provide the user with content items from an entity that are outside of the sequence, allowing further customization of interaction between the user and the entity's brand page responsive to the user's interaction with the sequence. Selecting content items from a sequence based on prior interaction between a user and the sequence allows the content selector 345 to provide the user with content items better tailored to the user's interest in content on the brand page or the user's level of exposure to content from the brand page.

Content Item Selection

Figure 4:
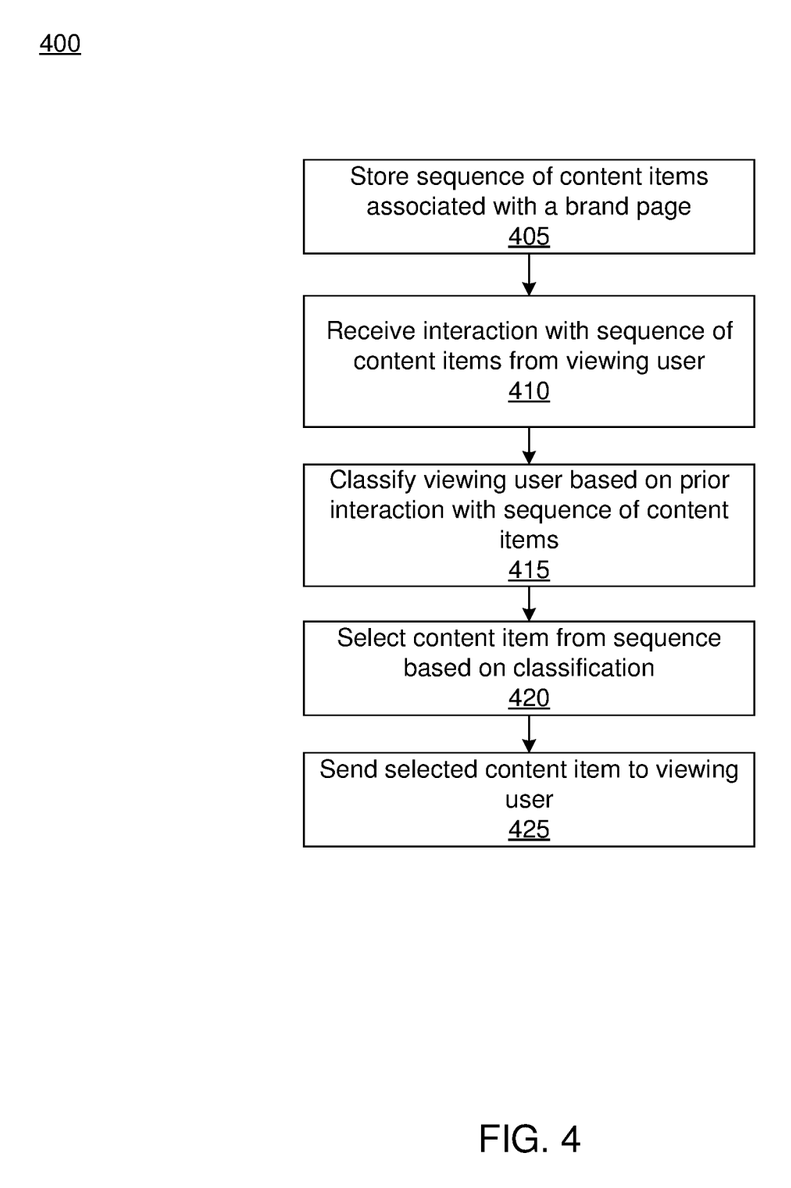
FIG. 4 is a flow chart of a method for selecting content items from a sequence of content items based on interaction with the sequence by a user of the social networking system, in accordance with an embodiment of the invention.

FIG. 4 is a flow chart of one embodiment of a method 400 for selecting content items from a sequence responsive to a viewing social networking system user's interaction with the sequence. The social networking system 240 stores 405 a sequence of content items in a content store 310. Content items comprising the sequence include different information that is dependent on interaction between a user and the sequence. In one embodiment, the sequence is specified by an entity associated with a brand page included in the social networking system 240. For example, the entity identifies a set of content items and an order in which the content items are presented based on interaction between the user and the sequence.

An interaction by the viewing user with the sequence is received 410 by the social networking system 240. For example, an initial content item from the sequence is presented when the viewing user accesses the brand page, and the viewing user's interaction with the initial content item is captured and stored to an action log 320. As another example, an interaction between the viewing user and a content item presented from the sequence is stored to the social networking system's action log 320. For example, the viewing user selects data included in a content item, shares data included in the content item with another user, comments on data included in the content item, likes data included in the content item or performs another type of interaction with data in the content item.

Based on the interaction with the sequence the viewing user is classified 415. In one embodiment, the classification may also account for one or more of prior interactions with the sequence, information retrieve from a user profile of the viewing user or criteria specified by the entity. For example, a content selector 345 classifies 415 the viewing user based on content items in the series with which the viewing user previously interacted and the types of previous interactions with content items in the sequence. If user profile information is also used in the embodiment, the content selector 345 retrieves data from a user profile associated with the viewing user and classifies 415 the viewing user based on the prior interaction, or interactions, with the sequence and the user profile data.

Using the classification of the viewing user, the content selector 345 selects 420 a content item from the sequence that is sent 425 to an electronic device associated with the viewing user. Classification of the viewing user affects selection of a content item from the sequence. For example, the viewing user is classified based on values selected from previous content items, with the previously selected values affecting which content item is selected 420. As another example, a content item is selected 420 based on whether or not the viewing user interacted with a previously presented content item from the sequence, so that interaction with content items cause the viewing user to traverse the sequence. Further, a content item may be selected 420 from the sequence based on whether or not the viewing user is classified as a user who has previously accessed a brand page; this allows the selected content item to provide the viewing user with information to in understanding content on the brand page.

The selected content item may be sent 425 to the viewing user in a variety of ways. For example, the selected content item is displayed when the viewing user accesses the brand page using an electronic device or the selected content item is included in a news feed story sent to an electronic device used by the viewing user. Alternatively, the selected content item is sent 425 as a message to the viewing user.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

maintaining, in an online system, a brand page associated with an entity, the brand page representing a presence of the entity in the online system for connecting to users of the online system and exchanging content with users of the online system;

storing, in the online system, the following:
  (1) a plurality of content items from the entity to be presented by the online system to users on the brand page, and
  (2) a sequence for the content items having an order of presentation that is defined by the entity for the social networking system to use in presenting the content items to the users, where the order of presentation of the content items is specified by the entity to provide an increasing level of detail related to the brand page from an initial content item to one or more next content items to a final content item of the sequence;

classifying users of the online system who are connected to the brand page based on whether the users have had prior interactions with the content items from the sequence, wherein different classifications of the users are provided different content items of the sequence;

responsive to a request from a first user to access the brand page and to the classification indicating that the first user has had no prior interaction with the content items from the sequence, providing, by the online system to the first user, the initial content item in the sequence for display on in the brand page; and responsive to a request from a second user to access the brand page and to the classification indicating that the second user has had a prior interaction with one or more of the content items that are not the final content item, providing, by the online system to the second user, the content item that is subsequent in the sequence to the one or more content items for display on the brand page.

2. The method of claim 1, wherein the prior interaction of the second user with the one or more of the content items from the sequence was performed at one or more webpages associated with the entity that are external to the online system.

3. The method of claim 2, further comprising:

providing an iframe to be installed on the one or more webpages associated with the entity, the iframe allowing content items posted on the brand page to be published on the one or more webpages associated with the entity;

receiving, from the iframe, information about the prior interaction of the second user with the one or more of the content items from the sequence and information identifying the second user; and classifying the second user based on the information received from the one or more webpages associated with the entity.

4. The method of claim 1, further comprising:

responsive to the classification indicating that a third user has had a prior interaction with the final content item from the sequence:

selecting a new content item that is not included in the sequence;

determining, based on the third user's prior interactions with one or more content items from the sequence, that the third user is likely to interact with the new content item if the new content item is presented to the third user; and in response to the determination, providing the new content item for display to the third user.

5. The method of claim 1, wherein the one or more content items with which the second user interacted comprise a plurality of candidate objects for the second user to select, the prior interaction performed by the second user including a selection of at least one of the candidate objects, and wherein the content item subsequent in the sequence to the one or more content items comprises content determined based on the selection of the second user.

6. The method of claim 1, further comprising:
retrieving demographic information about the first user and second user from user profiles associated with the first user and second user in the online system, the demographic information used in classifying the first user and second user.

7. The method of claim 1, further comprising:
providing, by the online system to the second user, a story associated with the content item subsequent in the sequence to the one or more content items for display in a newsfeed of the second user.

8. A non-transitory computer readable medium storing executable computer program instructions, the computer program instructions comprising instructions that when executed cause a computer processor to:
maintain, in an online system, a brand page associated with an entity, the brand page representing a presence of the entity in the online system for connecting to users of the online system and exchanging content with users of the online system;
store, in the online system, the following:
(1) a plurality of content items from the entity to be presented by the online system to users on the brand page, and
(2) a sequence for the content items having an order of presentation that is defined by the entity for the social networking system to use in presenting the content items to the users, where the order of presentation of the content items is specified by the entity to provide an increasing level of detail related to the brand page from an initial content item to one or more next content items to a final content item of the sequence;
classify users of the online system who are connected to the brand page based on whether the users have had prior interactions with the content items from the sequence, wherein different classifications of the users are provided different content items of the sequence;
responsive to a request from a first user to access the brand page and to the classification indicating that the first user has had no prior interaction with the content items from the sequence, provide, by the online system to the first user, the initial content item in the sequence for display on in the brand page; and
responsive to a request from a second user to access the brand page and to the classification indicating that the second user has had a prior interaction with one or more of the content items that are not the final content item, provide, by the online system to the second user, the content item that is subsequent in the sequence to the one or more content items for display on the brand page.

9. The computer readable medium of claim 8, wherein the prior interaction of the second user with the one or more of the content items from the sequence was performed at one or more webpages associated with the entity that are external to the online system.

10. The computer readable medium of claim 9, the computer program instructions further comprising instructions that when executed cause a computer processor to:
provide an iframe to be installed on the one or more webpages associated with the entity, the iframe allowing content items posted on the brand page to be published on the one or more webpages associated with the entity;
receive, from the iframe, information about the prior interaction of the second user with the one or more of the content items from the sequence and information identifying the second user; and
classify the second user based on the information received from the one or more webpages associated with the entity.

11. The computer readable medium of claim 8, the computer program instructions further comprising instructions that when executed cause a computer processor to:
responsive to the classification indicating that a third user has had a prior interaction with the final content item from the sequence:
select a new content item that is not included in the sequence;
determine, based on the third user's prior interactions with one or more content items from the sequence, that the third user is likely to interact with the new content item if the new content item is presented to the third user; and
in response to the determination, provide the new content item for display to the third user.

12. The computer readable medium of claim 8, wherein the one or more content items with which the second user interacted comprise a plurality of candidate objects for the second user to select, the prior interaction performed by the second user including a selection of at least one of the candidate objects, and wherein the content item subsequent in the sequence to the one or more content items comprises content determined based on the selection of the second user.

13. The computer readable medium of claim 8, the computer program instructions further comprising instructions that when executed cause a computer processor to:
retrieve demographic information about the first user and second user from user profiles associated with the first user and second user in the online system, the demographic information used in classifying the first user and second user.

14. The computer readable medium of claim 8, the computer program instructions further comprising instructions that when executed cause a computer processor to:
provide, by the online system to the second user, a story associated with the content item subsequent in the sequence to the one or more content items for display in a newsfeed of the second user.

15. A computer system comprising:
a non-transitory computer-readable storage medium storing executable computer program instructions, the computer program instructions comprising instructions that when executed cause a computer processor to perform steps, comprising:
maintaining, in an online system, a brand page associated with an entity, the brand page representing a presence of the entity in the online system for connecting to users of the online system and exchanging content with users of the online system;

storing, in the online system, the following:
(1) a plurality of content items from the entity to be presented by the online system to users on the brand page, and
(2) a sequence for the content items having an order of presentation that is defined by the entity for the social networking system to use in presenting the content items to the users, where the order of presentation of the content items is specified by the entity to provide an increasing level of detail related to the brand page from an initial content item to one or more next content items to a final content item of the sequence;

classifying users of the online system who are connected to the brand page based on whether the users have had prior interactions with the content items from the sequence, wherein different classifications of the users are provided different content items of the sequence;

responsive to a request from a first user to access the brand page and to the classification indicating that the first user has had no prior interaction with the content items from the sequence, providing, by the online system to the first user, the initial content item in the sequence for display on in the brand page; and responsive to a request from a second user to access the brand page and to the classification indicating that the second user has had a prior interaction with one or more of the content items that are not the final content item, providing, by the online system to the second user, the content item that is subsequent in the sequence to the one or more content items for display on the brand page.

16. The system of claim 15, wherein the prior interaction of the second user with the one or more of the content items from the sequence was performed at one or more webpages associated with the entity that are external to the online system.

17. The system of claim 16, the steps further comprising:
providing an iframe to be installed on the one or more webpages associated with the entity, the iframe allowing content items posted on the brand page to be published on the one or more webpages associated with the entity;
receiving, from the iframe, information about the prior interaction of the second user with the one or more of the content items from the sequence and information identifying the second user; and
classifying the second user based on the information received from the one or more webpages associated with the entity.

18. The system of claim 15, the steps further comprising:
responsive to the classification indicating that a third user has had a prior interaction with the final content item from the sequence:
  selecting a new content item that is not included in the sequence;
  determining, based on the third user's prior interactions with one or more content items from the sequence, that the third user is likely to interact with the new content item if the new content item is presented to the third user; and
  in response to the determination, providing the new content item for display to the third user.

19. The system of claim 15, wherein the one or more content items with which the second user interacted comprise a plurality of candidate objects for the second user to select, the prior interaction performed by the second user including a selection of at least one of the candidate objects, and wherein the content item subsequent in the sequence to the one or more content items comprises content determined based on the selection of the second user.

20. The system of claim 15, the steps further comprising:
retrieving demographic information about the first user and second user from user profiles associated with the first user and second user in the online system, the demographic information used in classifying the first user and second user.

* * * * *